(12) United States Patent
Discekici et al.

(10) Patent No.: US 12,186,980 B2
(45) Date of Patent: Jan. 7, 2025

(54) THREE-DIMENSIONAL PRINTING WITH HINDERED PHENOLIC ANTIOXIDANTS

(71) Applicant: HEWLETT-PACKARD DEVELOPMENT COMPANY, L.P., Spring, TX (US)

(72) Inventors: Emre Hiro Discekici, San Diego, CA (US); Shannon Reuben Woodruff, San Diego, CA (US); Graciela Emma Negri Jimenez, San Diego, CA (US); Jason Christopher Butler, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 140 days.

(21) Appl. No.: 17/908,777

(22) PCT Filed: Mar. 23, 2020

(86) PCT No.: PCT/US2020/024148
§ 371 (c)(1),
(2) Date: Sep. 1, 2022

(87) PCT Pub. No.: WO2021/194462
PCT Pub. Date: Sep. 30, 2021

(65) Prior Publication Data
US 2023/0158738 A1    May 25, 2023

(51) Int. Cl.
*B29C 64/165*    (2017.01)
*B33Y 10/00*    (2015.01)
*B33Y 70/10*    (2020.01)
*B29K 77/00*    (2006.01)
*B29K 105/00*    (2006.01)

(52) U.S. Cl.
CPC ............ *B29C 64/165* (2017.08); *B33Y 10/00* (2014.12); *B33Y 70/10* (2020.01); *B29K 2077/00* (2013.01); *B29K 2105/0044* (2013.01); *B29K 2105/251* (2013.01)

(58) Field of Classification Search
CPC ....... B33Y 10/00; B33Y 70/10; B29C 64/165; B29K 2105/0044; B29K 2077/00; B29K 2105/251
See application file for complete search history.

(56) References Cited

U.S. PATENT DOCUMENTS 6,395,811 B1    5/2002    Nguyen et al.
2018/0104894 A1    4/2018    Fung et al.

FOREIGN PATENT DOCUMENTS

CN    104910614 A    9/2015
GB    2567877 A    5/2019
WO    2019/018340 A1    1/2019

(Continued)

*Primary Examiner* — Monica A Huson
(74) *Attorney, Agent, or Firm* — HP Inc. Patent Department (57) ABSTRACT

The present disclosure describes multi-fluid kits for three-dimensional printing, three-dimensional printing kits, and methods of making three-dimensional printed objects. In one example, a multi-fluid kit for three-dimensional printing can include a fusing agent and an antioxidant agent. The fusing agent can include water and an electromagnetic radiation absorber that absorbs radiation energy and converts the radiation energy to heat. The antioxidant agent can include a liquid vehicle with water and from about 0.5 wt % to about 15 wt % hindered phenolic antioxidant dispersed in the liquid vehicle.

15 Claims, 5 Drawing Sheets

(56) References Cited

FOREIGN PATENT DOCUMENTS

| WO | 2019/075869 A1 | 4/2019 |
| WO | 2019/182577 A1 | 9/2019 |
| WO | 2020/005200 A1 | 1/2020 |

THREE-DIMENSIONAL PRINTING WITH HINDERED PHENOLIC ANTIOXIDANTS

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited. Accordingly, it can be difficult to three-dimensional print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

The present disclosure describes multi-fluid kits for three-dimensional printing, three-dimensional printing kits, and methods of making three-dimensional printed objects while reducing oxidation of polymeric build material used for three-dimensional printing. Adding sterically hindered phenols as antioxidants, referred to herein as "hindered phenolic antioxidants," can be beneficial in reducing the effects of oxidative degradation that may be due to the relatively high stress environment that the materials of the three-dimensional printing kits are subjected during the additive manufacturing processed described herein. Oxidative degradation may lead to cosmetic issues, reduced mechanical properties, or the like. By applying these antioxidants to the three-dimensional printed object using an antioxidant fluid agent, or "antioxidant agent," on a localized basis, negative impacts to the unused powder bed material that may otherwise be recycled can be minimized or reduced.

In accordance with this, in one example, a multi-fluid kit for three-dimensional printing can include a fusing agent and an antioxidant agent. The fusing agent can include water and an electromagnetic radiation absorber. The electromagnetic radiation absorber can absorb radiation energy and convert the radiation energy to heat. The antioxidant agent can include a liquid vehicle with water and from about 0.5 wt % to about 15 wt % hindered phenolic antioxidant dispersed in the liquid vehicle. In one example, the hindered phenolic antioxidant can include a compound with multiple hindered phenolic groups. In another example, the hindered phenolic antioxidant can have a melting point from about 50° C. to about 250° C. The hindered phenolic antioxidant can include milled particles that are dispersed in the liquid vehicle at an average particle size from about 50 nm to about 800 nm. In a more specific example, the hindered phenolic antioxidant can include a compound having the following structure:

where h-Ph is a hindered (h) phenolic (Ph) group, and n is from 2 to 8. In another example, the multi-fluid kit can further include a detailing agent including a detailing compound to reduce a temperature of powder bed material onto which the detailing agent is applied.

A three-dimensional printing kit can include a powder bed material including polymer particles, a fusing agent, and an antioxidant agent. The fusing agent can include water and an electromagnetic radiation absorber. The electromagnetic radiation absorber can absorb radiation energy and convert the radiation energy to heat. The antioxidant agent can include a liquid vehicle including water and from about 0.5 wt % to about 15 wt % hindered phenolic antioxidant dispersed in the liquid vehicle. In one example, the polymer particles can include polyamide-6, polyamide-9, polyamide-11, polyamide-12, polyamide-6,6, polyamide-6,12, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoride-trifluoroethylene-chlorotrifluoroethylene), wax, or a combination thereof. In one example, the hindered phenolic antioxidant can include a compound with multiple hindered phenolic groups. In another example, the hindered phenolic antioxidant can have a melting point from about 50° C. to about 250° C. The hindered phenolic antioxidant can include milled particles that are dispersed in the liquid vehicle at an average particle size from about 50 nm to about 800 nm. In another example, the three-dimensional printing kit can further include a detailing agent including a detailing compound to reduce a temperature of powder bed material onto which the detailing agent is applied.

In another example, a method of making a three-dimensional printed object can include iteratively applying individual build material layers of polymer particles to a powder bed, and based on a three-dimensional object model, selectively applying a fusing agent onto the individual build material layers. The fusing agent can include water and an electromagnetic radiation absorber. The method can further include, based on the three-dimensional object model, selectively applying an antioxidant agent onto the individual build material layers. The antioxidant agent can include a liquid vehicle including water and further include hindered phenolic antioxidant dispersed in the liquid vehicle. The method can further include exposing the powder bed to energy to selectively fuse the polymer particles in contact with the electromagnetic radiation absorber to form a fused polymer matrix at individual build material layers. In one example, selectively applying the antioxidant agent can include application of the antioxidant agent to the powder bed at areas outside of where the fusing agent is applied. In another example, the liquid vehicle further includes organic co-solvent and a dispersant. The hindered phenolic antioxidant can have an average particle size from about 50 nm to about 800 nm and are in the form of milled particles. The milled particles can be stabilized in the liquid vehicle by the dispersant. The dispersant can be, for example, a co-milled copolymer dispersant.

When discussing the three-dimensional printing kits or the method of printing a three-dimensional object herein, these discussions can be considered applicable to one another whether or not they are explicitly discussed in the context of that example. Thus, for example, when discussing a polymeric build material related to a three-dimensional printing kit, such disclosure is also relevant to and directly supported in the context of the other three-dimensional printing kit, the method of printing a three-dimensional object, and vice versa.

Terms used herein will have the ordinary meaning in their technical field unless specified otherwise. In some instances, there are terms defined more specifically throughout the specification or included at the end of the present specification, and thus, these terms can have a meaning as described herein.

The multi-fluid kits, three-dimensional printing kits, and methods described herein can be used to make three-dimensional printed objects with reduced yellowing due to oxidation. Certain three-dimensional (3D) printing processes can involve fusing layers of polymer particles to form solid layers of a three-dimensional printed object. In one example, a fusing agent can be jetted onto a powder bed of polymer particles. The fusing agent can include a radiation absorber, which can be a material that absorbs radiant energy and converts the energy to heat. Radiant energy can be applied to the powder bed to heat and fuse the polymer particles on which the fusing agent was applied. This process can involve often fairly intense and repeated heating, which can cause oxidation of the polymer particles. The oxidation can cause yellowing, browning, or other degradation of the polymer, such as mechanical degradation. In some cases, the loose powder in the powder bed can be recycled for use in printing another three-dimensional printed object. If the powder is degraded, then the degradation can affect subsequent printing and can be compounded by further degradation of the powder during subsequent printing.

Multi-Fluid Kits for Three-Dimensional Printing

Figure 1:
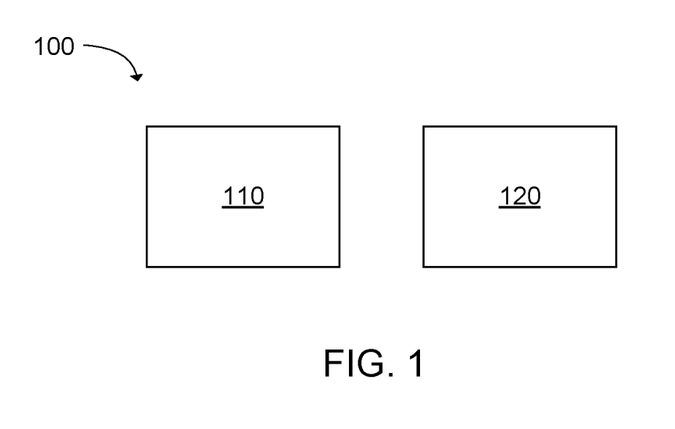
FIG. 1 is a schematic view of an example multi-fluid kit for three-dimensional printing in accordance with the present disclosure.

With this description in mind, FIG. 1 shows a schematic of an example multi-fluid kit for three-dimensional printing 100. The kit includes a fusing agent 110 and an antioxidant agent 120. The fusing agent can include water and an electromagnetic radiation absorber. The electromagnetic radiation absorber can absorb radiation energy and convert the radiation energy to heat. The antioxidant agent can include water and a dispersion of a hindered phenolic antioxidant. Details regarding the fusing agent and its components, and the antioxidant agent and its components are described in greater detail hereinafter.

Figure 2:
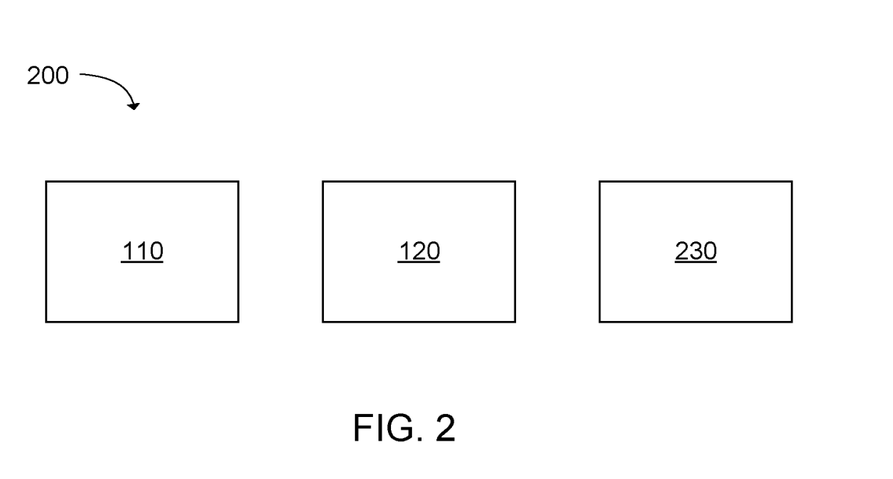
FIG. 2 is a schematic view of another example multi-fluid kit for three-dimensional printing in accordance with the present disclosure.

In a related example, FIG. 2 shows a schematic of another multi-fluid kit 200. This multi-fluid kit includes a fusing agent 110, an antioxidant agent 120, and a detailing agent 230. As in the example described above, the fusing agent can include water and an electromagnetic radiation absorber. The electromagnetic radiation absorber can absorb radiation energy and convert the radiation energy to heat. The antioxidant agent can include water and a dispersion of a hindered phenolic antioxidant. The same details as described herein with respect to the fusing agent and the antioxidant agent are relevant to this example as well.

The detailing agent, if included, can include a detailing compound that can reduce the temperature of powder bed material on which the detailing agent is applied. In some examples, the detailing agent can be applied around edges of the area where the fusing agent is applied. This can prevent powder bed material around the edges from caking due to heat from the area where the fusing agent is applied. The detailing agent can also be applied in the same area where fusing was applied in order to control the temperature and prevent excessively high temperatures when the powder bed material is fused. Reducing the temperature of the powder bed material can also help reduce oxidation of the powder bed material. Thus, in some examples, both the detailing agent and the antioxidant agent can be used to help control oxidation. Further details regarding the detailing agent are described hereinafter in greater detail.

Three-Dimensional Printing Kits

Figure 3:
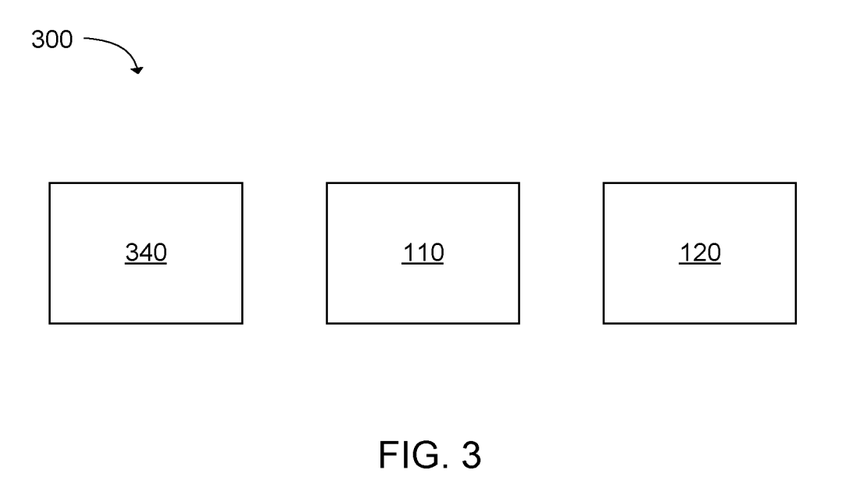
FIG. 3 is a schematic view an example three-dimensional printing kit in accordance with the present disclosure.

The present disclosure also describes three-dimensional printing kits. In some examples, the three-dimensional printing kits can include materials that can be used in the three-dimensional printing processes described herein. FIG. 3 shows a schematic illustration of one example three-dimensional printing kit 300 in accordance with examples of the present disclosure. The kit includes a powder bed material 340 including polymer particles, a fusing agent 110 to selectively apply to the powder bed material, and an antioxidant agent 120 to selectively apply to the powder bed material. The fusing agent can include water and an electromagnetic radiation absorber. The electromagnetic radiation absorber can absorb radiation energy and convert the radiation energy to heat. The antioxidant agent can include water and a dispersion of a hindered phenolic antioxidant.

Figure 4:
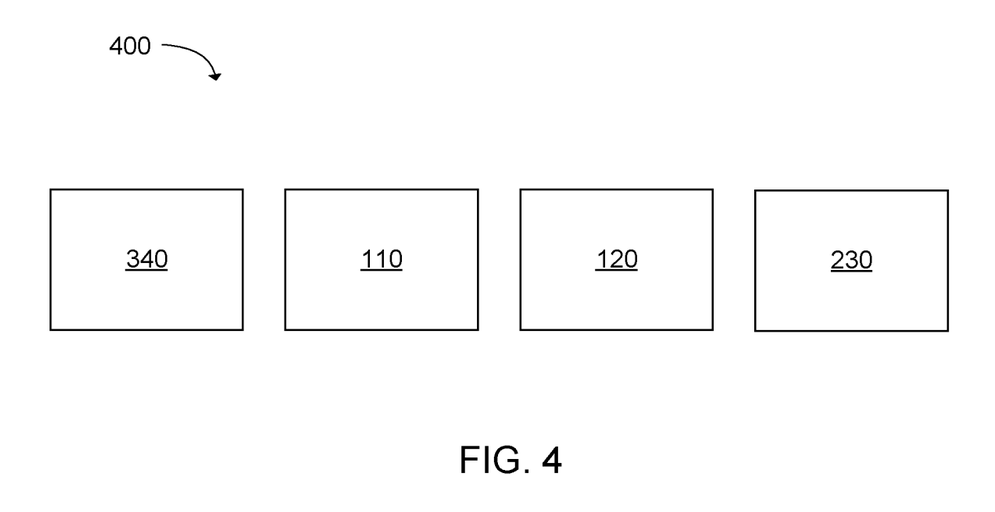
FIG. 4 is a schematic view of another example three-dimensional printing kit in accordance with the present disclosure.

In further examples, a three-dimensional printing kit can include additional fluid agents, such as a detailing agent. FIG. 4 is a schematic illustration of another example three-dimensional printing kit 400 that includes a powder bed material 340, a fusing agent 110, an antioxidant agent 120, and a detailing agent 230. The fusing agent, antioxidant agent, and detailing agent can include any of the ingredients listed herein.

Figure 5A:
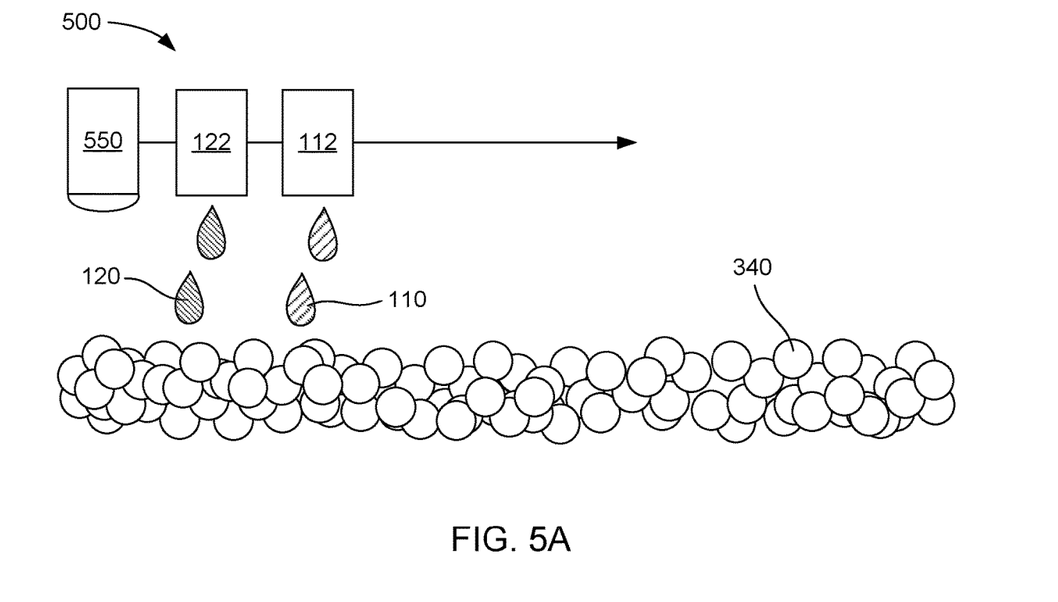
FIGS. 5A-5C show a schematic view of an example three-dimensional printing process using an example three-dimensional printing kit in accordance with the present disclosure.
Figure 5B:
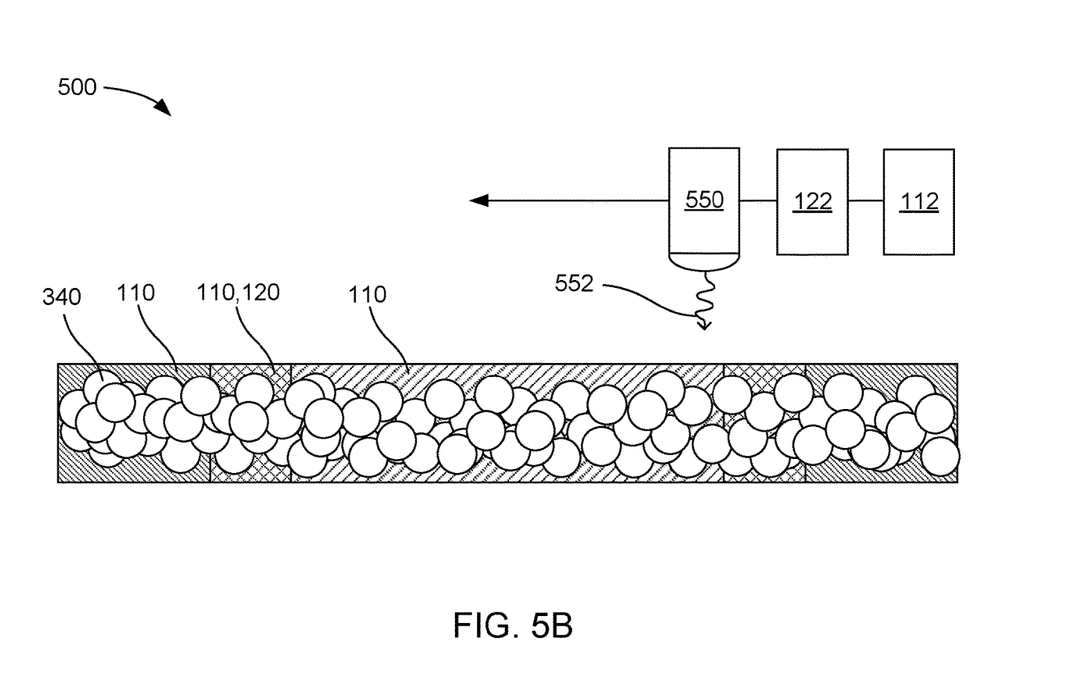
Figure 5C:
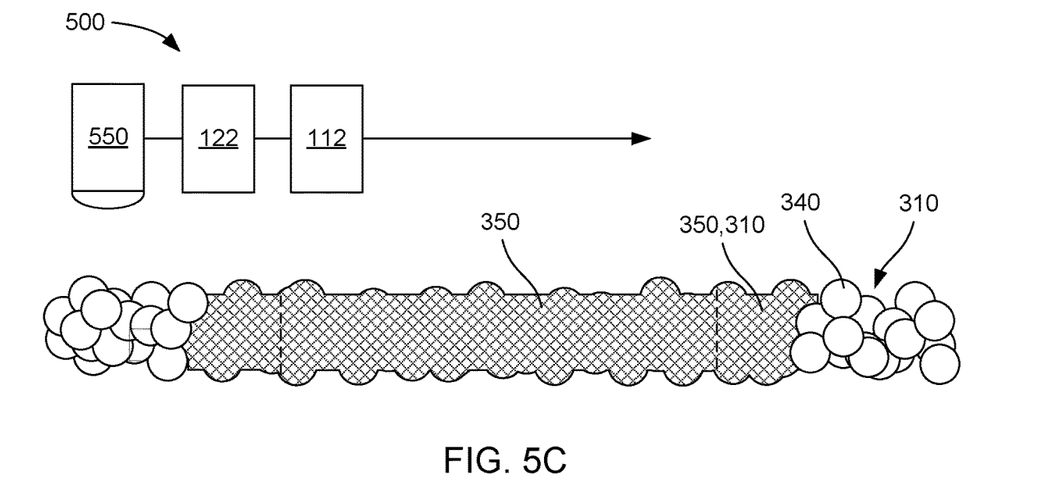

To illustrate the use of the three-dimensional printing kits and multi-fluid kits described herein, FIGS. 5A-5C illustrate an example system 500, e.g., illustrating one example method, that can be used for three-dimensional printing kit to form a three-dimensional printed object. In FIG. 5A, a fusing agent 110 and an antioxidant agent 120 are applied, e.g., jetted, onto a layer of powder bed material 340, which is a bed including polymeric particles for fusing. The fusing agent is jetted from a fusing agent ejector 112 and the antioxidant agent is jetted from an antioxidant agent ejector 122. These fluid ejectors can move across the layer of powder bed material to selectively jet fusing agent on areas that are to be fused. A radiation source 550 is also shown, which is described in more detail in the context of FIG. 5B.

The antioxidant agent can be jetted on areas where reduction in oxidation is desired or indicated as being helpful in some capacity.

The system 500 is further described in FIG. 5B, which shows the layer of powder bed material 340 after the fusing agent 110 has been jetted onto an area of the layer that is to be fused. Additionally, the antioxidant agent 120 has been jetted onto both areas outside of the area where the fusing agent is applied, e.g., to control yellowing, to provide for enhanced recyclability properties, etc., as well as to portions of the same area where fusing agent is applied. If the concern is one of yellowing or discoloration of the three-dimensional printed part, then application along an edge of the printed object may be sufficient. If the concern is one of mechanical properties, the hindered phenolic antioxidant can be applied to greater areas of the printed object. The region shown with multi-directional cross hatching (shown as 110, 120) represents a region where both the fusing agent and the antioxidant agent are applied, though other printing area protocols or strategies can be used, depending on the result that is being sought. In this figure, the radiation source 550 is shown emitting radiation 552 toward the layer of polymer particles. The fusing agent can include a radiation absorber that can absorb this radiation and convert the radiation energy to heat.

The system 500 further depicts use of the various kits described herein in FIG. 5C, where a layer of powder bed material 340 with a fused portion 350 is shown where the fusing agent was jetted. This portion has reached a sufficient temperature to fuse the polymer particles together to form a solid polymer matrix. The hindered phenolic antioxidant 310 from the antioxidant agent remains present in this example both partially within a portion of the fused area, as well as outside of the fused area so that the hindered phenolic antioxidant can reduce the level of oxidation occurring in the fused area. For context, the fusing agent ejector 112, the antioxidant agent ejector 122, and the radiation source 550 are shown in place to apply the next applications of fusing agent, antioxidant agent, and/or radiation 552 to the next layer of powder bed material, to thereby continue to build the three-dimensional object iteratively.

Powder Bed Materials

In certain examples, the powder bed material can include polymer particles having a variety of shapes, such as substantially spherical particles or irregularly-shaped particles. In some examples, the polymer powder can be capable of being formed into three-dimensional printed objects with a resolution of about 20 μm to about 100 μm, about 30 μm to about 90 μm, or about 40 μm to about 80 μm. As used herein, "resolution" refers to the size of the smallest feature that can be formed on a three-dimensional printed object. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm or from about 40 μm to about 80 μm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide-6 powder, polyamide-9 powder, polyamide-11 powder, polyamide-12 powder, polyamide-6,6 powder, polyamide-6,12 powder, thermoplastic polyamide powder, polyamide copolymer powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, aromatic polyesters, silicone rubber, polypropylene powder, polyester powder, polycarbonate powder, copolymers of polycarbonate with acrylonitrile butadiene styrene, copolymers of polycarbonate with polyethylene terephthalate, polyether ketone powder, polyacrylate powder, polystyrene powder, polyvinylidene fluoride powder, polyvinylidene fluoride copolymer powder, poly(vinylidene fluoride-trifluoroethylene) powder, poly(vinylidene fluoride-trifluoroethylene-chlorotrifluoroethylene) powder, or mixtures thereof. In a specific example, the polymer powder can be polyamide-12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In further examples, a filler can be encapsulated in polymer to form polymer encapsulated particles. For example, glass beads can be encapsulated in a polymer such as a polyamide to form polymer encapsulated particles. In some examples, a weight ratio of thermoplastic polymer to filler in the powder bed material can be from about 100:1 to about 1:2 or from about 5:1 to about 1:1.

Fusing Agents

The multi-fluid kits and three-dimensional printing kits described herein can include a fusing agent to be applied to the polymer build material. The fusing agent can include a radiation absorber that can absorb radiant energy and convert the energy to heat. In certain examples, the fusing agent can be used with a powder bed material in a particular three-dimensional printing process. A thin layer of powder bed material can be formed, and then the fusing agent can be selectively applied to areas of the powder bed material that are desired to be consolidated to become part of the solid three-dimensional printed object. The fusing agent can be applied, for example, by printing such as with a fluid ejector or fluid jet printhead. Fluid jet printheads can jet the fusing agent in a similar way as an inkjet printhead jetting ink. Accordingly, the fusing agent can be applied with great precision to certain areas of the powder bed material that are desired to form a layer of the final three-dimensional printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the three-dimensional printing system. The print mode can include any variables or parameters that can be controlled during three-dimensional printing to affect the outcome of the three-dimensional printing process.

The process of forming a single layer by applying fusing agent and irradiating the powder bed can be repeated with additional layers of fresh powder bed material to form additional layers of the three-dimensional printed object, thereby building up the final object one layer at a time. In this process, the powder bed material surrounding the three-dimensional printed object can act as a support material for the object. When the three-dimensional printing is complete, the article can be removed from the powder bed and any loose powder on the article can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

In further examples, the radiation absorber can include a tungsten bronze or a molybdenum bronze. In certain examples, tungsten bronzes can include compounds having the formula $M_xWO_3$, where M is a metal other than tungsten and x is equal to or less than 1. Similarly, in some examples, molybdenum bronzes can include compounds having the formula $M_xMoO_3$, where M is a metal other than molybdenum and x is equal to or less than 1.

In still other examples, the radiation absorber can be selected to provide that the fusing agent is a "low tint fusing agent" that may be transparent, pale in color, or white. For example, the electromagnetic radiation absorber may be transparent or white at wavelengths ranging from about 400 nm to about 780 nm. In some examples, the term "transparent" as used herein, indicates that about 20% or less of the radiation having wavelengths from about 400 nm to about 780 nm is absorbed. Thus, in examples herein, the low tint fusing agent can be white, colorless, or pale in coloration so that coloring agent can be effective in coloring the polymeric powder bed material without much, if any, interference in coloration from the radiation absorber. At the same time, the low tint fusing agent can generate heat when exposed to electromagnetic energy wavelengths from 800 nm to 4,000 nm sufficient to partially or fully melt or coalesce the polymeric powder bed material that is in contact with the low tint fusing agent.

In alternative examples, the radiation absorber can preferentially absorb ultraviolet radiation. In some examples, the radiation absorber can absorb radiation in a wavelength range from about 300 nm to about 400 nm. In certain examples, the amount of electromagnetic energy absorbed by the fusing agent can be quantified as follows: a layer of the fusing agent having a thickness of 0.5 µm after liquid components have been removed can absorb from 90% to 100% of radiant electromagnetic energy having a wavelength within a wavelength range from about 300 nm to about 400 nm. The radiation absorber may also absorb little or no visible light, thus making the radiation absorber transparent to visible light. In certain examples, the 0.5 µm layer of the fusing agent can absorb from 0% to 20% of radiant electromagnetic energy in a wavelength range from about 400 nm to about 700 nm. Non-limiting examples of ultraviolet absorbing radiation absorbers can include nanoparticles of titanium dioxide, zinc oxide, cerium oxide, indium tin oxide, or a combination thereof. In some examples, the nanoparticles can have an average particle size from about 2 nm to about 300 nm, from about 10 nm to about 100 nm, or from about 10 nm to about 60 nm.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, material for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol, 1,2-propanediol, and 1,5-pentanediol.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt/o.

In certain examples, the fusing agent can include a polar organic solvent. As used herein, "polar organic solvents" can include organic solvents made up of molecules that have a net dipole moment or in which portions of the molecule have a dipole moment, allowing the solvent to dissolve polar compounds. The polar organic solvent can be a polar protic solvent or a polar aprotic solvent. Examples of polar organic solvents that can be used can include diethylene glycol, triethylene glycol, tetraethylene glycol, C3 to C6 diols, 2-pyrrolidone, hydroxyethyl-2-pyrrolidone, 2-methyl-1,3 propanediol, poly(propylene glycol) with 1, 2, 3, or 4 propylene glycol units, glycerol, and others. In some examples, the polar organic solvent can be present in an amount from about 0.1 wt % to about 20 wt % with respect to the total weight of the fusing agent.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as TERGITOL™ 15-S-12, TERGITOL™ 15-S-7 available from Dow Chemical Company (Michigan), LEG-1 and LEG-7; TRITON™ X-100; TRITON™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™

(Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Antioxidant Agents

In examples herein, the multi-fluid kits or three-dimensional printing kits can include an antioxidant agent. The antioxidant agent can be a fluid agent that includes water and a dispersion of a hindered phenolic antioxidant. This agent can be applied selectively to the powder bed during three-dimensional printing to reduce oxidation of the powder bed material in any desired area.

Because the hindered phenolic antioxidant can be included in the antioxidant agent as a fluid independent of the polymeric particles and/or the fusing agent, the hindered phenolic antioxidant can be selectively applied to the powder bed material during three-dimensional printing application techniques. Therefore, in some cases the amount of antioxidant applied can be specifically tailored to the amount of oxidation expected in various parts of the powder. In other examples, the antioxidant can be applied to selectively reduce yellowing in certain portions of the three-dimensional printed object, such as reducing yellowing at visible surfaces of the three-dimensional printed object while allowing the interior to be yellowed. The application of the antioxidant to the powder bed can also be specifically tailored to various different powder bed materials. Different polymers may be susceptible to different levels of oxidation and degradation. Even powder bed materials having the same type of polymer particles may differ one from another because various different additives may be included in the powder bed materials. Additives such as antioxidants, flow aids, fillers, anti-static agents, and others can be included in powder bed materials. The identity and amount of these materials may not be known to the end user. In some cases, fluid agents used in the three-dimensional printing process can also interact with the powder bed material to increase oxidation of the powder. Accordingly, it can be useful to have the fluid agents contain a hindered phenolic antioxidant as described herein to allow for customized application of the antioxidant to various different powder bed materials that may have different oxidation tendencies. The antioxidant fluid agents can reduce dependence of the three-dimensional printing process on the state of the powder bed material when received from a supplier (i.e., with any unknown additives that may be present in the material). Thus, the fluid agents and methods described herein can be useful to provide customized antioxidant application for various purposes.

In further detail, in some examples, the antioxidant agent can be applied to areas outside of where the fusing agent is applied, and in other examples, the antioxidant agent can be applied to areas where the fusing agent is also applied. In further detail, the antioxidant can be applied to both areas where the fusing agent is applied and areas outside of where the fusing agent is applied. Thus, there is some flexibility as to where and how much hindered amine antioxidant is applied to selected locations on an as-needed or as-desired basis. In fused areas (where fusing agent and electromagnetic energy is applied), these areas can be fused together to become parts of the final three-dimensional printed object. The antioxidant agent applied in these areas can help reduce oxidation of the polymer making up the final three-dimensional printed object. In other examples, the antioxidant agent can be applied to the entire powder bed, or to powder bed areas not being fused, if oxidation reduction is desired for all of the powder bed material across the entire bed or to powder not being fused for purposes of recyclability, or other reasons that may be relevant to the unused polymer particles of the powder bed. In further examples, the antioxidant agent can be applied in specific areas, such as areas that experience higher temperatures than other areas.

Regarding the hindered phenolic antioxidant, this type of antioxidant is part of a class of antioxidants referred to as "primary antioxidants," which may react with chain-propagating radicals in a chain terminating reaction, e.g., free-radical scavengers that combine with peroxy and/or alkoxy radicals to break autocatalytic cycles. In some cases, secondary antioxidants or even other primary antioxidants can be used in conjunction with the hindered phenolic antioxidants to reduce oxidation as well.

This particular group of primary antioxidants are referred to herein as "hindered" phenols as they include one or more hindering groups or bulky group on the aromatic ring immediately adjacent to the carbon atom with the hydroxyl group of the phenol, for example. An example bulky group may be something like a tertiary butyl (t-butyl) group or other similar bulky group that hinders how the hydroxyl group might otherwise function. The bulky group (or hindering group) can be an aliphatic moiety, such as a C1 to C8 straight-chained alkyl group, a C3-C8 branched alkyl group, an alicyclic group, or a combination thereof. The hindering group could likewise be another hydroxyl group or two hydroxyl groups on the carbon atom(s) immediately adjacent the aromatic carbonyl group of the phenol, e.g., gallates. These compounds with three hydroxyl groups on immediately adjacent carbon atoms of the aromatic ring still have a propensity to deprotonate the center hydroxyl group to form a stable radical. Other bulky or hindering groups can also be present as well in the alternative.

Non-limiting examples of hindered phenolic antioxidants can include compounds, such as those with the following formulation:

where h-Ph is a hindered (h) phenolic (Ph) group, and n is from 2 to 8. The hindered phenolic group may include one bulky alkyl group attached to an aromatic immediately adjacent to the carbon bonded to the hydroxyl group, or may include two bulky alkyl groups immediately adjacent to the hydroxyl group. The "bulky group," for example, may be a C1 to C8 straight-chained alkyl group, a C3 to C8 branched alkyl group, an alicyclic group, or a combination thereof. The bulky group can also be hydroxyl or other moieties that act as a hindering group while retaining the propensity for the aromatic carbonyl group to deprotonate and form a stable radical. In some examples, where there is only one bulky group, the other carbon on the other side of the carbonyl group on the aromatic ring can be H, for example.

In one example, the bulky group is a C3 to C8 branched alkyl group present on one or both sides of the aromatic carbonyl group. To provide some examples, there may be two t-butyl bulky groups attached to the aromatic carbon atoms on either side of the aromatic carbonyl moiety of the phenol. In another example, there may be one t-butyl group on one side of the carbonyl group, with a non-bulky group on the other. One particular example of a hindered phenolic antioxidant that falls into this latter category Irganox® 245, from BASF (Germany), with the chemical name ethylene bis(oxyethylene) bis-(3-(5-tert-butyl-4-hydroxy-m-tolyl)-propionate), and having the following structure:

Many hindered phenolic antioxidants can be immiscible in water. This can make it difficult to add the hindered phenolic antioxidants to a water-based jettable fluid agent. Accordingly, in some examples a dispersion of the hindered phenolic antioxidant can be formed and a dispersion formed can be included in the antioxidant agent. In certain examples, the hindered phenolic antioxidant can be mixed with water and a dispersant or surfactant added to form a dispersion of particles of the hindered phenolic antioxidant. In some examples, the particle size of the dispersion can be reduced by milling, such as with a dispersant, until the antioxidant particles are small enough to be more easily jettable, stable in a fluid, etc.

Many hindered phenolic antioxidants may not be miscible or easily dispersible in water or other aqueous liquid vehicles. In a particular example, hindered phenolic antioxidant can be dispersed by heating the hindered phenolic antioxidant above its melting point, and then forming an emulsion of the molten antioxidant in water or other aqueous liquid vehicle. For example, dispersant, surfactant, organic co-solvent, or the like can be used with water to generate the molten droplet emulsion. The emulsion can then be cooled to form a dispersion of particles of the hindered phenolic antioxidant. In some examples, the particle size of the hindered phenolic antioxidant can be reduced by milling with added dispersant, or with the dispersant used to prepare the emulsion, for example, e.g., a copolymer dispersant such as a styrene-acrylic copolymer, e.g., Joncryl® 683, from BASF (Germany), Disperbyk 190, from BYK (USA), or the like. Smaller emulsified dispersed particles of the hindered phenolic antioxidant can be well suited for remaining stable and for use in a jettable fluid agent, e.g., the antioxidant agent as described herein. For example, in some instances, milling the hindered phenolic antioxidant with a dispersant, such as a copolymer dispersant, can help to provide particle sizes and surface modification or adsorption that can act to stabilize the particles in the antioxidant agent. For example, the hindered phenolic antioxidant can be prepared to have an average particle size from about 50 nm to about 800 nm, and in some instances, milling can be used to provide an average particle size within this range, or to a smaller average particle size within this range. In other examples, the hindered phenolic antioxidant can be prepared to have an average particle size from about 150 nm to about 500 nm or from about 200 nm to about 450 nm. The particle size of the hindered phenolic antioxidant particles can be prepared within this range, or can be prepared within or outside of this size range and reduced in size by grinding or milling, for example, such as with a dispersant, as previously mentioned.

In a particular example, the dispersion of the hindered phenolic antioxidant can be formed by emulsifying the hindered phenolic antioxidant in water. In some cases, the hindered phenolic antioxidant can have a relatively low melting point so that the hindered phenolic antioxidant can be melted and then the melted hindered phenolic antioxidant can be dispersed or emulsified in water. In certain examples, the hindered phenolic antioxidant can have a melting point from about 50° C. to about 250° C., from about 80° C. to about 150° C., or from about 90° C. to about 130° C. The hindered phenolic antioxidant can be melted and then mixed with water and a surfactant or dispersant to form an emulsion of the melted hindered phenolic antioxidant. The emulsion can then be cooled to form a dispersion of solid hindered phenolic antioxidant particles.

In further examples, the dispersion of the hindered phenolic antioxidant can be included in the antioxidant agent at a concentration from about 0.5 wt % to about 15 wt %. In still further examples, the amount of hindered phenolic antioxidant can be from about 0.5 wt % to about 10 wt % or from about 1 wt % to about 8 wt % with respect to the total weight of the antioxidant agent. In further detail, where applied, the hindered phenolic antioxidant can be introduced at locations of a layer or multiple layers of the powder bed at a weight ratio from about 1:40 to about 1:250, from about 1:40 to about 1:200, from about 1:50 to about 1:150, or from about 1:50 to about 1:100, for example.

In some examples, the antioxidant agent can include an organic co-solvent. The organic co-solvent can be included in an amount from about 1 wt % to about 20 wt % with respect to the total weight of the antioxidant agent, in some examples. In other examples, the organic co-solvent can be included in an amount from about 2 wt % to about 15 wt % or from about 5 wt % to about 15 wt %. The organic co-solvent can include any of the organic co-solvents described above in the fusing agent.

As also mentioned, the antioxidant agent can include a dispersant, such as a polymeric copolymer that may be or may become associated with a surface of the hindered phenol antioxidant that is dispersed in the liquid vehicle.

The antioxidant agent can also include ingredients to allow the antioxidant agent to be jetted by a fluid jet printhead. In some examples, the antioxidant agent can include jettability imparting ingredients as part of the liquid vehicle, such as surfactant, organic co-solvent, biocide, viscosity modifier, pH adjuster, sequestering agent, preservative, and so on. These and other ingredients can be included in accordance with the details described previously with respect to the fusing agent, for example.

Detailing Agents

In further examples, multi-fluid kits or three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not promote fusion of the powder printed with the detailing agent when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Methods of Making Three-Dimensional Printed Objects

Figure 6:
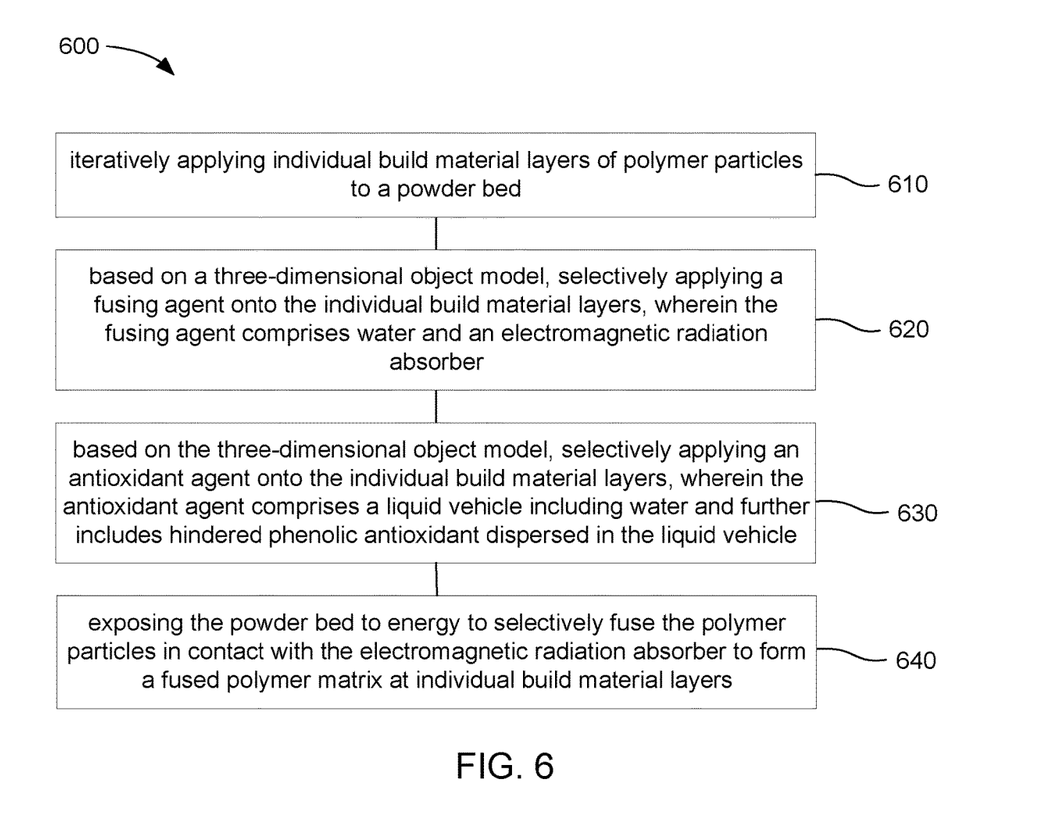
FIG. 6 is a flowchart illustrating an example method of making a three-dimensional printed object in accordance with the present disclosure.

The present disclosure also describes methods of making three-dimensional printed objects. FIG. 6 shows a flowchart illustrating an example method 600 of making a three-dimensional printed object. The method includes iteratively applying 610 individual build material layers of polymer particles to a powder bed, and based on a three-dimensional object model, selectively applying 620 a fusing agent onto the individual build material layers. The fusing agent can include water and an electromagnetic radiation absorber. The method can further include, based on the three-dimensional object model, selectively applying 630 an antioxidant agent onto the individual build material layers. The antioxidant agent can include a liquid vehicle including water and can further include hindered phenolic antioxidant dispersed in the liquid vehicle. The method can further include exposing 640 the powder bed to energy to selectively fuse the polymer particles in contact with the electromagnetic radiation absorber to form a fused polymer matrix at individual build material layers. In one example, selectively applying the antioxidant agent can include application of the antioxidant agent to the powder bed at areas outside of where the fusing agent is applied. In another example, the liquid vehicle further includes organic co-solvent and a dispersant. The hindered phenolic antioxidant can have an average particle size from about 50 nm to about 800 nm and is in the form of milled particles. The milled particles can be stabilized in the liquid vehicle by the dispersant. The dispersant can be, for example, a co-milled copolymer dispersant.

In certain examples, the method can also include forming the dispersion of the hindered phenolic antioxidant. In one example, the method can include forming the dispersion by melting the hindered phenolic antioxidant and emulsifying the melted hindered phenolic antioxidant with water. The emulsification can be cooled below the melting point of the hindered phenolic antioxidant to form dispersed antioxidant particles. The dispersed hindered phenolic antioxidant particles can then be milled to reduce the average particle size of the hindered phenolic antioxidant particles. In some examples, the average particle size of the hindered phenolic antioxidant particles after milling can be within the average particle size ranges recited above.

The dispersion of hindered phenolic antioxidant particles can be added to the antioxidant agent in a sufficient amount so that the hindered phenolic antioxidant is present in an amount from about 0.5 wt % to about 15 wt %. Notably, the term "dispersion" in this context refer to a liquid medium with hindered phenolic antioxidant particles contained therein. Some may be suspended and others may settle out and benefit from agitation. This dispersion can be used to form the antioxidant agent, which when formulate appropriately, can dispersed the particles more suitably for use with fluid jet application, for example.

In some examples, a detailing agent can also be jetted onto the powder bed. As described above, the detailing agent can be a fluid that reduces the maximum temperature of the polymer powder on which the detailing agent is printed. In particular, the maximum temperature reached by the powder during exposure to electromagnetic energy can be less in the areas where the detailing agent is applied. In certain examples, the detailing agent can include a solvent that evaporates from the polymer powder to evaporatively cool the polymer powder. The detailing agent can be printed in areas of the powder bed where fusing is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas The fusing agent, antioxidant agent, and in some instances, the detailing agent can be applied onto the powder bed using fluid jet print heads, e.g., jetting or ejecting from printing architecture. The amount of the fusing agent used can be calibrated based the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the powder bed as a whole can be preheated to a temperature below the melting or softening point of the polymer powder. In one example, the preheat temperature can be from about 10° C. to about 30° C. below the melting or softening point. In another example, the preheat temperature can be within 50° C. of the melting or softening point. In a particular example, the preheat temperature can be from about 160° C. to about 170° C. and the polymer powder can be polyamide-12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure to coalesce printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass.

The three-dimensional printed object can be formed by jetting a fusing agent onto layers of powder bed build material according to a 3D object model. 3D object models can in some examples be created using computer aided design (CAD) software. 3D object models can be stored in any suitable file format. In some examples, a three-dimensional printed object as described herein can be based on a single 3D object model. The 3D object model can define the three-dimensional shape of the article. In some cases, an antioxidant agent can be added to portions of the three-dimensional printed object, such as portions near the surface where yellowing would be visible. In further examples, the antioxidant agent can be added to portions of the powder bed that will remain as loose powder after printing, such as areas of the powder bed adjacent to the surface of the three-dimensional printed object. In such examples, the 3D object model may include both the three-dimensional shape of the article and also the three-dimensional shape of the portion of the volume where the antioxidant agent is to be added. In other examples, the article can be defined by a first 3D object model and the antioxidant agent portions can be defined by a second 3D object model. Other information may also be included, such as structures to be formed of additional different materials or color data for printing the article with various colors at different locations on the article. The 3D object model may also include features or materials specifically related to jetting fluids on layers of powder bed material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, concentration of the antioxidant, and so on. All this information can be contained in a single 3D object file or a combination of multiple files. The three-dimensional printed object can be made based on the 3D object model. As used herein, "based on the 3D object model" can refer to printing using a single 3D object model file or a combination of multiple 3D object models that together define the article. In certain examples, software can be used to convert a 3D object model to instructions for a three-dimensional printer to form the article by building up individual layers of build material.

In an example of the three-dimensional printing process, a thin layer of polymer powder can be spread on a bed to form a powder bed. At the beginning of the process, the powder bed can be empty because no polymer particles have been spread at that point, or the first layer can applied onto an existing powder bed, e.g., support powder that is not used to form the three-dimensional object. For the first layer, the polymer particles can be spread onto an empty build platform. The build platform can be a flat surface made of a material sufficient to withstand the heating conditions of the three-dimensional printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the printing can increase temperature uniformity of the three-dimensional printed object. A fluid jet printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "kit" can be synonymous with and understood to include a plurality of multiple components where the different components can be separately contained (though in some instances co-packaged in separate containers) prior to use, but these components can be combined together during use, such as during the three-dimensional object build processes described herein. The containers can be any type of a vessel, box, or receptacle made of any material.

As used herein, "applying" when referring to a fluid agent that may be used, for example, refers to any technology that can be used to put or place the fluid, e.g., fusing agent, fluid recycling agent, detailing agent, coloring agent, or the like on the polymeric build material or into a layer of polymeric build material for forming a three-dimensional object. For example, "applying" may refer to a variety of dispensing technologies, including "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as up to about 20 picoliters, up to about 30 picoliters, or up to about 50 picoliters, etc. Example ranges may include from about 2 picoliters to about 50 picoliters, or from about 3 picoliters to about 12 picoliters.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the MASTERSIZER™ 3000 available from Malvern Panalytical (United Kingdom). The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Preparation of Hindered Phenolic Antioxidant Composition

A sample composition of a hindered phenolic antioxidant was prepared. The hindered phenolic antioxidant used in this example was Irganox® 245, from BASF (Germany), which is an antioxidant with multiple hindered phenolic groups, which is sometimes chemically referred to as ethylene bis(oxyethylene) bis-(3-(5-tert-butyl-4-hydroxy-m-tolyl)-propionate). In this example, 6 grams of the hindered phenolic antioxidant was mixed with 1.5 grams of stearic acid and 1.5 grams of steely alcohol. The mixture was melted at 100° C. while stirring. The temperature was then reduced to 75° C. and continuously stirred. 300 mg of 50% KOH in water was added and then 4.5 mL of deionized water was added dropwise. This formed a viscous paste. 120 mL of cold water was then added slowly as an emulsion formed. The mixture was ultimately cooled to room temperature and 40 mL more water was added. The mixture was then placed in a ball mill for 48 hours. The sample composition prepared included some dispersed particles and some settling particles of the hindered phenolic antioxidant.

In some examples, ball mixing occurred for the 48 hour time period in the presence of one of two selected styrene acrylic copolymer dispersants. Though the two dispersants were both styrene acrylic copolymers, there were different in several ways, e.g., molecular weight, weight ratio, etc. The two dispersants evaluated more specifically were Joncryl® 683 from BASF (Germany) and Disperbyk® 190 from BYK (USA). After milling for 48 hours, the particle size distribution for the hindered phenolic antioxidant particles was as follows:

TABLE 1

| Particle Size Distribution Data | | | |
|---|---|---|---|
| Dispersant ID | Mv (nm) | D50 (nm) | D95 (nm) |
| Joncryl ® 683 | 505 | 470 | 1.034 |
| Disperbyk ® 190 | 339 | 336 | 633 |

"Mv" refers to average particle size.
"D50" refers to the mean particle size where about 50% of the particles are larger and about 50% of the particle sizes are smaller (by particle count).
"D95" refers to the particle size where about 5% of the particles are larger and about 95% of the particles are smaller (by particle count).

Example 2—Preparation of Antioxidant Agent Containing Hindered Phenolic Antioxidant A sample antioxidant agent including the hindered phenolic antioxidant dispersion prepared in accordance with Example 1 was prepared with an organic co-solvent, a surfactant, and water. The total amount of the hindered phenolic antioxidant dispersion in the antioxidant agent was 2 wt % (4 wt % of dispersion were hindered amine antioxidant particles); the amount of organic co-solvent was about 10 wt %; the amount of surfactant was 0.9 wt %, and the balance of 87.1 wt % was water. Notably, the hindered phenolic antioxidant dispersion included ingredients such as water, other organic co-solvents, and KOH, so those compounds would also be present in small amounts in the antioxidant agent.

Example 3—Jettability and Nozzle Health Evaluation of Antioxidant Agent

To evaluate jettability and nozzle health performance of the antioxidant agent prepared in accordance with Example 2, a small amount of AR-52 magenta dye was added to a portion of the antioxidant agent to enable its visualization, and the magenta-tinted antioxidant agent was loaded into an inkjet printer. A test pattern was printed on paper using the magenta dyed antioxidant agent. The magenta dye allowed the printing to be visually inspected. The test print showed that the antioxidant agent was printed successfully from the inkjet printer with excellent pen reliability, jettability, and decap up to 16 seconds. Thus, the addition of the hindered phenolic antioxidant to a jettable fluid did not appear to adversely impact nozzle health and printability.

Example 4—Antioxidant Agent Effect on Polyamide-12 Particles

To test the efficacy of the antioxidant agent in reducing oxidation of polymer powder bed material, a series of oven aged polyamide-12 powder was compared. A first oven aged polyamide-12 powder was evaluated without any fluid modification (referred to in Table 2 as "Aged"), a second polyamide-12 powder was admixed with the liquid vehicle of Example 2 but without the hindered phenolic antioxidant present (referred to in Table 2 as "Aged LV"), and a third polyamide-12 powder was admixed with the antioxidant agent of Example 2 and then aged (referred to in Table 2 as "Aged AA"). The aging process used on these samples was to artificially age in an oven at 165° C. for 20 hours. The powder samples were removed from the oven and homogenized before colorimetric measurements were taken. This experiment was carried out three times, and the data was averaged and standard deviation determined. Measurements were also taken for three fresh samples of polyamide-12 powder as a reference (referred to in Table 2 as "Fresh"). The raw experiment and average colorimetric data, along with the standard deviation, is shown in Table 2. The values for L*, a*, and b* in the CIE L*a*b* color space were measured by an EXACT™ spectrophotometer (X-Rite, USA). As a point of reference, the lower the value of b*, for example, is a better result, as it indicates less yellowing, which correlates with less polymer degradation.

TABLE 2

| Sample ID | L* | a* | b* |
|---|---|---|---|
| Fresh 1 | 95.46 | −0.52 | 0.90 |
| Fresh 2 | 94.63 | −0.54 | 0.87 |
| Fresh 3 | 93.96 | −0.53 | 0.91 |
| Fresh (Average) | 94.68 | −0.53 | 0.89 |
| Fresh Standard Deviation | 0.75 | 0.01 | 0.02 |
| Aged 1 | 89.71 | 0.23 | 15.28 |
| Aged 2 | 90.75 | 0.39 | 15.74 |
| Aged 3 | 88.58 | 0.38 | 15.31 |
| Aged Average | 89.68 | 0.33 | 15.44 |
| Aged Standard Deviation | 1.09 | 0.09 | 0.26 |
| Aged LV 1 | 86.71 | 0.19 | 14.42 |
| Aged LV 2 | 86.26 | 0.21 | 14.35 |
| Aged LV 3 | 86.71 | 0.14 | 14.16 |
| Aged LV Average | 86.56 | 0.18 | 14.31 |
| Aged LV Standard Deviation | 0.26 | 0.04 | 0.13 |
| Aged AA 1 | 95.27 | −0.34 | 6.88 |
| Aged AA 2 | 94.92 | −0.39 | 6.93 |
| Aged AA 3 | 94.93 | −0.31 | 6.92 |
| Aged AA Average | 95.04 | −0.35 | 6.91 |
| Aged AA Standard Deviation | 0.20 | 0.04 | 0.03 |

Figure 7:
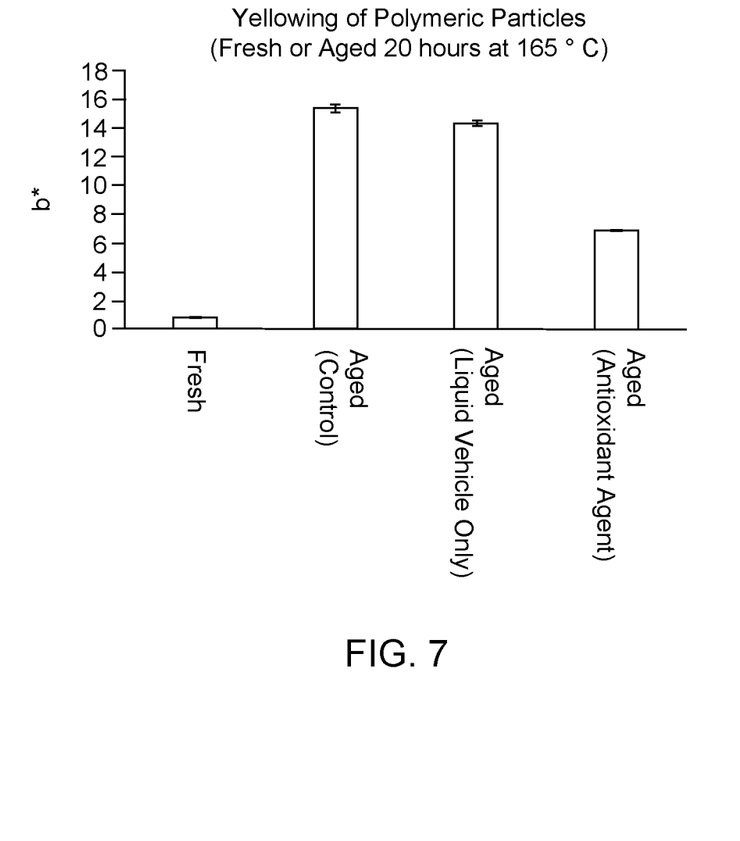
FIG. 7 is an example graph showing reduction of yellowing using antioxidant agents on polymer particles in accordance with the present disclosure.

To visually illustrate the discoloration improvement provided by the use of the hindered phenolic antioxidant applied using an antioxidant agent, the b* values, which are the most related to the impact of yellowing, are provided in FIG. 7. The data from Table 2, and as partially illustrated in FIG. 7, confirms the mitigation of yellowing and browning when using the antioxidant agent with the polymeric particles compared to aged polymeric particles that did not benefit from the presence of the antioxidant agent. Thus, this and other antioxidant agent formulations is expected to be useful in three-dimensional printing processes that involve jetting fluid agents onto polymeric particles of a powder bed material, including polyamide powders.

What is claimed is:

1. A multi-fluid kit for three-dimensional printing comprising:
   a fusing agent comprising water and an electromagnetic radiation absorber, wherein the electromagnetic radiation absorber absorbs radiation energy and converts the radiation energy to heat; and
   an antioxidant agent comprising a liquid vehicle including water and from about 0.5 wt % to about 15 wt % hindered phenolic antioxidant dispersed in the liquid vehicle.

2. The multi-fluid kit of claim 1, wherein the hindered phenolic antioxidant includes a compound with multiple hindered phenolic groups.

3. The multi-fluid kit of claim 1, wherein the hindered phenolic antioxidant has a melting point from about 50° C. to about 250° C.

4. The multi-fluid kit of claim 1, wherein the hindered phenolic antioxidant includes milled particles dispersed in the liquid vehicle at an average particle size from about 50 nm to about 800 nm.

5. The multi-fluid kit of claim 1, wherein the hindered phenolic antioxidant includes a compound having the following structure:

where h-Ph is a hindered phenolic group, and n is from 2 to 8.

6. The multi-fluid kit of claim 1, wherein the hindered phenolic antioxidant includes a compound having the following structure:

7. The multi-fluid kit of claim 1, further comprising a detailing agent including a detailing compound to reduce a temperature of powder bed material onto which the detailing agent is applied.

8. A three-dimensional printing kit comprising:
a powder bed material comprising polymer particles;
a fusing agent to be selectively applied to the powder bed material, the fusing agent comprising water and an electromagnetic radiation absorber, wherein the electromagnetic radiation absorber absorbs radiation energy and converts the radiation energy to heat; and
an antioxidant agent to be selectively applied to the powder bed material, the antioxidant agent comprising a liquid vehicle including water and from about 0.5 wt % to about 15 wt % hindered phenolic antioxidant dispersed in the liquid vehicle.

9. The three-dimensional printing kit of claim 8, wherein the polymer particles are selected from the group consisting of polyamide-6 particles, polyamide-9 particles, polyamide-11 particles, polyamide-12 particles, polyamide-6,6 particles, polyamide-6,12 particles, thermoplastic polyamide particles, polyamide copolymer particles, polyethylene particles, thermoplastic polyurethane particles, polypropylene particles, polyester particles, polycarbonate particles, polyether ketone particles, polyacrylate particles, polystyrene particles, polyvinylidene fluoride particles, polyvinylidene fluoride copolymer particles, poly (vinylidene fluoride-trifluoroethylene) particles, poly (vinylidene fluoride-trifluoroethylene-chlorotrifluoroethylene) particles, wax particles, and a combination thereof.

10. The three-dimensional printing kit of claim 8, wherein the hindered phenolic antioxidant includes a compound with multiple hindered phenolic groups.

11. The three-dimensional printing kit of claim 8, wherein the hindered phenolic antioxidant is dispersed in the liquid vehicle and includes milled particles having an average particle size from about 50 nm to about 800 nm, and wherein the hindered phenolic antioxidant has a melting point from about 50° C. to about 250° C.

12. A method of making a three-dimensional printed object comprising:
iteratively applying individual build material layers of polymer particles to a powder bed;
based on a three-dimensional object model, selectively applying a fusing agent onto the individual build material layers, wherein the fusing agent comprises water and an electromagnetic radiation absorber;
based on the three-dimensional object model, selectively applying an antioxidant agent onto the individual build material layers, wherein the antioxidant agent comprises a liquid vehicle including water and further includes hindered phenolic antioxidant dispersed in the liquid vehicle; and
exposing the powder bed to energy to selectively fuse the polymer particles in contact with the electromagnetic radiation absorber to form a fused polymer matrix at individual build material layers.

13. The method of claim 12, wherein selectively applying the antioxidant agent includes application of the antioxidant agent to the powder bed at areas outside of where the fusing agent is applied.

14. The method of claim 12, wherein the liquid vehicle further includes an organic co-solvent and a dispersant.

15. The method of claim 14, wherein the hindered phenolic antioxidant has an average particle size from about 50 nm to about 800 nm and are in the form of milled particles, wherein the milled particles are stabilized in the liquid vehicle by the dispersant, and wherein the dispersant includes a co-milled copolymer dispersant.

* * * * *